United States Patent [19]

Shih et al.

[11] Patent Number: 4,773,748

[45] Date of Patent: Sep. 27, 1988

[54] DYNAMICALLY CONTROLLED MIRROR FOR REDUCTION OF PROJECTED IMAGE DISTORTION

[75] Inventors: I-Fu Shih, Seal Beach; David B. Chang, Tustin; Peter L. Garrett, Santa Monica; Norton L. Moise, Pacific Palisades, all of Calif.

[73] Assignee: Hughes Aircraft Company, Los Angeles, Calif.

[21] Appl. No.: 658,954

[22] Filed: Oct. 9, 1984

[51] Int. Cl.⁴ .......................... G02B 5/10; G02B 7/18; G02B 17/18; G02B 27/18

[52] U.S. Cl. ................................... 350/611; 350/607; 355/52

[58] Field of Search ............... 350/611, 607, 360, 361, 350/503; 355/52; 250/201

[56] References Cited

U.S. PATENT DOCUMENTS

| | | | |
|---|---|---|---|
| 3,904,274 | 9/1975 | Feinleib et al. | 350/607 |
| 4,091,274 | 5/1978 | Angelbeck et al. | 250/201 |
| 4,271,355 | 6/1981 | Wisner et al. | 250/201 |

FOREIGN PATENT DOCUMENTS 212869  1/1957  Australia .
573656  3/1933  Fed. Rep. of Germany ...... 350/607
136977 10/1979  Japan ................................. 350/607

OTHER PUBLICATIONS

Air Force Report AFHRL-TR-81-27(I), Wide-Angle, Multiviewer, Infinity Display System, A. W. Zepf, Jun. 1982.

*Primary Examiner*—Jon W. Henry
*Attorney, Agent, or Firm*—Leonard A. Alkov; A. W. Karambelas

[57] ABSTRACT

A deformable mirror system for reduction of projected image distortion in an optical system is disclosed. The mirror is adapted to correct for ray direction. In accordance with the invention, a mirror is located near an intermediate image plane. The distortion in the image is predetermined, and the mirror is contorted in a manner determined by the distortion to be corrected; relationships are prescribed for the desired contortion. Significant reduction in distortion can be achieved by placement of a mirror near the image plane; furthere reduction can be achieved in accordance with the invention by the placement of an additional contorted mirror at a subsequent image-forming aperture in the optical system.

9 Claims, 5 Drawing Sheets

DYNAMICALLY CONTROLLED MIRROR FOR REDUCTION OF PROJECTED IMAGE DISTORTION

BACKGROUND OF THE INVENTION

The present invention is directed to the reduction of distortion in a projected image, and more particularly to the use of a deformed mirrors in optical systems.

Distortion in a projected image can be reduced by the use of a compound correcting lens, contorted mirrors, computer image generator, or a scan converter. The latter two are complicated and costly, although they have the advantage of application to cases of severe distortion as easily as to cases of moderate distortion. The lens approach is also costly to develop, since the correction system has to be carefully designed to avoid introducing other aberrations. The mirror approach is relatively simple and inexpensive to implement and can be made dynamic (i.e., variable in time) as well. An example is the deformed mirror which is used with the light valve projection system described in Air Force report documentation AFHRL-TR-81-27(I).

Carefully deformed mirrors are finding frequent use in adaptive optical systems to reduce distortions in wavefronts. The general idea is to use the deformation to compensate for the phase distortions carried by the incident waves. An example occurs in the high powered lasers that launch beams into the atmosphere; here the backs of the large mirrors have arrays of servo-driven actuators that deform them to compensate for distortions in the wavefronts produced by fluctuations in atmospheric density along the beam path. The use of purposely deformed mirrors is the inverse to the situation in large space telescopes where servos are used to remove the deformations that occur because of the reduced gravity.

In adaptive optical systems, feedback loops are used to dynamically adjust the mirror deformation and adjust for the distortion caused by atmospheric inhomogeneity.

In general, the known prior art techniques employing deformable mirrors are employed to provide only phase compensation to the incident radiation wave. Thus, for example, fluctuations in atmospheric density cause phase distortions in the laser wave, and the deformed mirror is adapted to correct for these phase distortions. Insofar as is understood by applicants, however, these prior art devices are not employed to provide direction compensation to the projected light rays.

It is, therefore, an object of the present invention to provide a deformable mirror system adapted to provide direction compensation for distortion in a projected image.

Another object of the invention is to provide a prescription for determining the optimal shape of a mirror to reduce distortion in a projected image.

A further object of the invention is to provide a prescription for stressing a flat mirror to provide the optimal shape for reducing distortion in a projected image.

Yet another object of the present invention is to provide a system employing a dynamically deformable mirror for reduction of distortion in a dynamically projected image.

Another object of the invention is to provide a distorted mirror system adapted to minimize the distortion in an image projected from an oblique angle onto a curved surface, from a normal angle onto a curved surface, or from an oblique angle onto a flat surface.

SUMMARY OF THE INVENTION

A contorted mirror system for reduction of projected image distortion in an optical system is disclosed. The mirror is adapted to correct for optical ray direction. In accordance with the invention, a mirror is located near an intermediate image plane. The distortion in the image is predetermined, and the mirror is contorted in a manner determined by the distortion to be corrected; a relationship is prescribed for the desired contortion. Significant reduction in distortion can be achieved by placement of a mirror near the image plane; further reduction can be achieved in accordance with the invention by the placement of an additional contorted mirror near a subsequent image-forming aperture in the optical system.

Novel relationships are set forth to determine the required displacement of a planar mirror. A dynamically deformable mirror is disclosed, wherein heating elements are applied to the non-reflecting surface of a bimetallic mirror so as to cause displacement of the mirror in a desired manner. The mirror may be used in a dynamic sense so as to change the mirror contortion to adapt to changes in the distortion to be corrected.

Other features and improvements are disclosed.

BRIEF DESCRIPTION OF THE DRAWINGS

These and other objects, features and advantages of the present invention will become more apparent from the following detailed description of exemplary embodiments thereof, as illustrated in the accompanying drawings, in which.

DETAILED DESCRIPTION OF THE INVENTION

The present invention comprises a novel deformable mirror system for reduction of distortion in a projected image. The following description of the preferred embodiments is provided to enable any person skilled in the art to make and use the invention. Various modifications to the disclosed embodiments will be readily apparent. The invention is not intended to be limited to the embodiments shown, but is to be accorded the widest scope consistent with the principles and novel features of the invention.

1. Optimal Mirror Configuration

The corrections to the distortion that are possible with a single mirror are first considered, and a variational principle is used to obtain expressions for the optimum shape of a correcting mirror.

Figure 1:
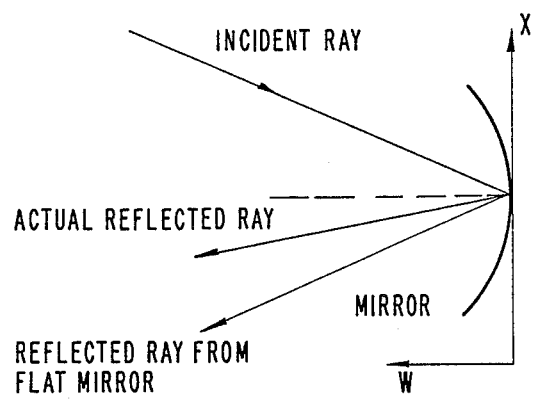
FIG. 1 is a simplified ray diagram illustrating the additional deflection of a light ray on reflection from a non-flat mirror.

A mirror located near an image plane in an optical system is considered, as illustrated in FIG. 1. If the mirror is flat, the relative directions of the reflected rays will be a faithful reproduction of the relative directions of the incident rays. Deviation of the mirror from flatness will result in a change in these relative directions. Accordingly, a nonflat mirror can be used to change the relative directions of the rays which define a projected image, and thereby reduce distortion resulting from other causes.

Quantitatively, a Euclidean coordinate system may be chosen which is oriented so that the flat mirror plane is the $Z=0$ plane. The mirror is located at this plane, and the (small) deviation in the Z-direction of the mirror from flatness is denoted by $W(x,y)$. When $\Delta w = \vec{i}_x \delta W/\delta x + \vec{i}_y \delta W/\delta y \neq 0$, a ray incident at the point $(x,y)$ experiences an additional angular deflection on reflection over that which it would experience on reflection from a flat mirror. The additional angular deflection about the $\vec{i}_x$ axis is $2\delta W/\delta y$, and that about the $\vec{i}_y$ axis is $2\delta W/\delta x$, where the factor 2 occurs since the angle of reflection is equal to the angle of incidence. Accordingly, an incident ray with direction cosines (k, l, and $m \approx 1$) which is reflected from the portion of the mirror at the position $(x,y)$ will become a reflected ray with direction cosine close to $(k - 2\delta W/\delta x, l - 2\delta W/\delta y, m \approx -1)$. This is illustrated in FIG. 1 (for the x-component).

If a flat mirror would reflect an object point to some point $(x,y)$ in a subsequent image plane, then the distorted mirror will shift this image point to $(x - C'\delta W/\delta x, y - C' \delta W/\delta y)$, where $C'$ is the proportionality factor, whose value is determined by the system optics, which converts angular to linear measures. That is to say, a nonflat mirror causes a shift in image position $\vec{x}$ by an amount proportional to the gradient of $W(x,y)$:

$$\vec{x} \rightarrow \vec{x} - C'\Delta W \qquad (1)$$

The fact that a contorted mirror shifts image points by amounts proportional to the gradient of a scalar quantity implies limitations on the degree to which distortion can be reduced by this means. Distortion causes an image point which should have appeared at the position $\vec{x}=(x,y)$ in an image plane to appear instead at the position $\vec{x}+\vec{\Delta}(x,y)$. Distortion reduction with a single contorted mirror near some intermediate image plane would then (by Equation (1)) cause the image point to undergo an additional shift proportional to $\Delta w$, as shown by Equation 2.

$$\vec{x}+\vec{\Delta}(x,y) \rightarrow \vec{x}+\vec{\Delta}(x,y) - C'\Delta W(x,y) \qquad (2)$$

It would be desirable to choose $W(x,y)$ so that $C'\Delta W$ would cancel $\vec{\Delta}$ exactly. However, this is not possible in general. Any vector field can be written as a sum of a gradient of a scalar and the curl of another vector. Hence, $$\vec{\Delta}(x,y) = \Delta x \vec{A}(x,y) + \Delta B(x,y) \qquad (3)$$

Only the portion of $\vec{\Delta}$ described by the second term can be eliminated completely by $C'\Delta W$.

One way to determine the form of $W(x,y)$ which will reduce the distortion as much as possible, is to minimize the magnitude of the error $|\vec{\Delta} - C'\Delta W|$ averaged over the desired field of view.

$$\delta \int\int dxdy[(\Delta_x - C'\delta W/\delta x)^2 + (\Delta_y - C'\delta W/\delta y)^2] = 0 \qquad (4)$$

The Euler-Lagrange equation corresponding to Equation 4 is the two dimensional Poisson equation of Equation 5.

$$C'\Delta^2 W(x,y) = \Delta \cdot \vec{\Delta}(x,y) \qquad (5)$$

Accordingly, the optimal form for $W(x,y)$ may be obtained by solving Equation 5. In terms of the quantities A and B of Equation 3, Equation 5 becomes $$C'\Delta^2 W(x,y) \Delta \Delta^2 B \qquad (6)$$

when $W(x,y)$ is chosen in this way, $$\vec{x}+\vec{\Delta} \rightarrow \vec{x} + \Delta x A + \Delta B - \Delta B - C'\Delta W_H = \vec{x} + \Delta x \cdot \vec{A} - C'\Delta W_H, \qquad (7)$$

where $W_H$ is any solution to the homogeneous equation $$\Delta^2 W_H(x,y) = 0 \qquad (8)$$

(In particular, $W_H$ could be set equal to zero.) In any event, however, it is clear that the portion of $\vec{\Delta}$ which has a curl ($\Delta x \vec{\Delta} = \Delta x \Delta x \vec{A}$) cannot be eliminated by this means.

Depending on the circumstances, it may sometimes be desirable to place more value on reducing the distortion in some parts of the field of view than in others. In that case, a weighting function $P(x,y)$ should be inserted in the relationship expressed in Equation 4:

$$\delta \int\int dx\, dy\, P(x,y)\left[\left(\Delta_x - C'\frac{\partial W}{\partial x}\right)^2 + \left(\Delta_y - C'\frac{\partial W}{\partial y}\right)^2\right] = 0 \qquad (9)$$

The corresponding Euler-Lagrange equation is then $$C'\Delta^2 W + C'\Delta \ln P \cdot \Delta W = \vec{\Delta}\cdot\vec{\Delta} + \vec{\Delta}\cdot\Delta \ln P \qquad (10)$$

The limitation of the simple distortion reduction procedure described above does not, of course, apply to more complex systems of compound mirrors. For instance, following the correction optics introduced near an image plane as described above, the same type of procedure may be followed at the position of a subsequent image forming aperture. In the plane of this aperture, the field amplitudes are the spatial Fourier transforms of the image. A contorted mirror introduced at this aperture operates directly, not on the image position coordinates x, but rather on the transform variables k. The transforms of $\vec{\Delta}$, $\vec{A}$ and B, respectively, may be denoted by $\vec{\Delta}_k$, $\vec{A}_k$ and $B_k$, as shown for $\vec{\Delta}_k$ in Equation 11.

$$\vec{\Delta}_k(k_x, k_y) = \int e^{i\vec{k}\cdot\vec{x}} \vec{\Delta}(x,y) dx dy, \vec{k} = (k_x, k_y) \quad (11)$$

It will be seen that $$\Delta_k \cdot \vec{\Delta}_k = -i\vec{k}\cdot(\Delta_k \times \vec{A}_k) + i[2B_k + \vec{k}\cdot\vec{\Delta}_k B_k] \quad (12)$$

and $$\Delta_k \times \vec{\Delta}_k = i[(\vec{A}_k \cdot \Delta_k)\vec{k} - 2\vec{A}_k - (\vec{k}\cdot\vec{\Delta}_k)\vec{A}_k + \vec{k}(\Delta_k \cdot \vec{A}_k)-] + i\Delta_k B_k \times \vec{k} \quad (13)$$

The significance of Equations 12 and 13 is that, in the transform space (i.e., the space of an image-forming aperture), both the curl and gradient portions of $\vec{\Delta}$ contribute to the portions of $\vec{\Delta}_k$ which have a curl and a gradient in $\vec{K}$. This mixing of contributions means that a contorted mirror applied in the image forming aperture can eliminate some of the portion of $\vec{\Delta}$ which has a curl in the image space (by eliminating a portion of $\vec{A}$). Thus, by successively and alternatively applying the gradient corrections in image and image-forming aperture spaces it is possible to reduce the distortion further.

In the following section, the simplest case of a single contorted mirror inserted near an image plane is considered. This is a useful case, since a large portion of the distortion can be removed in this way, and since fabrication of such a mirror is fairly easy. The controlling optical equation for this case is either Equation 5 or 10, depending on whether or not a subjective weighting factor P(x,y) is included.

2. Mirror Construction: Stress Deformation

For the correction of small distortions, it is reasonable to construct a deformed mirror from a thin planar mirror. The equations for the deflection of a laterally loaded elastic plate may be used to calculate the required distortion of stresses to deform the mirror. The basic equations are discussed in the book "Theory of Plates and Shells," by S. Timoshenko, McGraw-Hill Book Company, New York, 1940, and comprise Equations 14a–d.

$$M_x = -D\frac{\partial^2 W}{\partial x^2} + \nu \frac{\partial^2 W}{\partial y^2} \quad (14a)$$

$$M_y = -D\frac{\partial^2 W}{\partial y^2} + \nu \frac{\partial^2 W}{\partial x^2} \quad (14b)$$

$$M_{xy} = -M_{yx} = D(1-\nu)\frac{\partial^2 W}{\partial x \partial y} \quad (14c)$$

$$\frac{\partial^2 M_x}{\partial x^2} - 2\frac{\partial^2 M_{xy}}{\partial x \partial y} + \frac{\partial^2 M_y}{\partial y^2} = -p \quad (14d)$$

In Equations 14a–d, the undeformed plate is disposed in the x-y plane and, as before, W(x,y) is the deformation of the plate in the Z-direction. In these equations.

$$D = \frac{Eh^3}{12(1-\nu^2)} \quad (15)$$

where h is the thickness of the plate, E is the modulus of elasticity which relates unit elongations $\epsilon$, stress $\sigma$ and $\nu$ is Poisson's ratio, defined by Equation 16.

$$\epsilon_x = \frac{\sigma_x}{E} - \frac{\nu \sigma_y}{E}, \epsilon_y = \frac{\sigma_y}{E} - \frac{\nu \sigma_x}{E} \quad (16)$$

The bending moment about the y-axis is denoted by $M_x$, and that about the x-axis is denoted by $M_y$. The twisting moment $M_{xy}$ is defined by Equation 17.

$$M_{xy} = -\int_{-h/2}^{h/2} \tau_{xy} z dz \quad (17)$$

where $\tau_{xy}$ is the shear stress, i.e., the force per unit area of an y-z plane in the y-direction. The force per unit area normal to the plate is denoted by p(x,y).

These equations take on a particularly simple form when the plate is uniform, i.e., when D does not depend on (x,y). In that case, the equations reduce to $$\left(\frac{\partial^2}{\partial x^2} + \frac{\partial^2}{\partial y^2}\right)\left(\frac{\partial^2 W}{\partial x^2} + \frac{\partial^2 W}{\partial y^2}\right) = \frac{p}{D} \quad (18)$$

An even more convenient form for the optics application of the deformed plate occurs on defining the parameter M as shown in Equation 19.

$$M = \frac{M_x + M_y}{1 + \nu} \quad (19)$$

Equation 14 can then be written as shown in Equations 20a–b.

$$\frac{\partial^2 M}{\partial x^2} + \frac{\partial^2 M}{\partial y^2} = -p \quad (20a)$$

$$\frac{\partial^2 W}{\partial x^2} + \frac{\partial^2 W}{\partial y^2} = -\frac{M}{D} \quad (20b)$$

On combining Equations 5 and 20 for a uniform plate mirror, the average magnitude of the distortion over the field of view will be minimized for an applied stress distribution p(x,y) of $$p(x,y) = \frac{D}{C}, \nabla^2 (\nabla \cdot \Delta(x,y)) \quad (21)$$

with a moment distribution $$M(x,y) = \frac{D}{C}, \nabla \cdot \Delta(x,y) \quad (22)$$

A surprising result is that the required forces on the plate mirror can be calculated directly from the distortion $\vec{\Delta}(x,y)$ which it is desired to reduce, without having to calculate the deformation W(x,y) from Equation 5.

3. Image Quality

In the foregoing, the conditions for the optimal reduction of image distortion have been derived. Some degree of image blurring can be expected to accompany this distortion reduction.

To estimate the blurring, it is necessary to take into account the fact that, in order for the mirror to have an effect on distortion, it cannot be located exactly in an intermediate image plane of the projection system. If the mirror is located exactly in an intermediate image plane, all of the reflected rays from a single point of the mirror will be focused to the same point by the subsequent optics, regardless of their directions of travel. Accordingly, the mirror must be located away from an intermediate image plane in order for changes in ray direction to have an effect on image distortion.

On the other hand, location of the mirror exactly in the image plane would have the advantage that each point of the image is affected by only the corresponding point of the mirror. Thus, the change in the directions of the reflected rays defining a single image point is determined by the slope of the mirror at the single point where incident rays for this image point strike the mirror. Accordingly, the mirror should not be located so far away from the image plane that a local change in the mirror slope will not be translatable into a relatively local change in image distortion.

Figure 2:
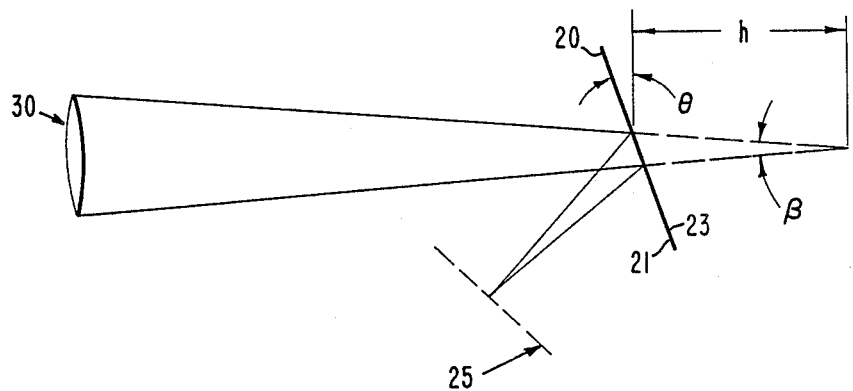
FIG. 2 is a simplified ray diagram illustrating the geometrical relationships employed to estimate deflection and image blurring.

To quantify the blurring to be expected, the two-dimensional situation depicted in FIG. 2 is considered. FIG. 2 shows a correction mirror 20 located a distance $h$ from an intermediate image plane 25, at an angle $\theta$ with respect to the image plane. The rays impinging on the mirror are assumed to come from a lens 30 which subtends an angle $\beta$ at the image plane. The presence of the mirror causes the rays to be focused onto the plane 25 indicated by the dashed line. If an incoming ray is reflected from a point on the mirror where the slope is $\theta + \delta W/\delta x$, then the corresponding image point will be deflected by an additional amount $(\delta W/\delta x)h$ $$\text{Deflection} = h(\delta W \delta x) \tag{23}$$

Thus, if the image size is I, the average fractional change in distortion $\epsilon$ that can be introduced by this means is $$\epsilon = \frac{h}{I} < \frac{\partial w}{\partial x} > \tag{24}$$

Blurring of the image is associated with the fact that the bundle of rays defining an image point intersect the mirror over a distance $h\beta/\cos\theta$ in which the slope of the mirror is not necessarily constant. Thus, the angle of deflection can vary by $(h\beta/\cos\theta)\delta^2W/\delta x^2$ because of the variation of $\delta W/\delta x$ over $h\beta/\cos\theta$, and this gives a blurring of an image point of amount $$\text{Blur} = h\left(\frac{h\beta}{\cos\theta}\right)\frac{\partial^2 W}{\partial x^2} \tag{25}$$

The quadratic dependence of blurring on the distance $h$, compared to the linear dependence of deflection, suggests that the mirror be located fairly close to an intermediate image plane. The ratio of blur to deflection is $$\frac{\text{Blur}}{\text{Deflection}} \approx \left(\frac{h\beta}{\cos\theta}\right)\left(\frac{\partial^2 W}{\partial x^2} / \frac{\partial W}{\partial x}\right) \tag{26}$$

If the mirror size is taken to be the same as the image size I, and if $\delta^2W/\delta x^2$ is taken to be of order $(\delta W/\delta W)/I$, then Equation 26 gives $$\frac{\text{Blur}}{\text{Deflection}} \approx \frac{h\beta}{I\cos\theta} \tag{27}$$

The angle $\beta$ subtended by the lens can be removed from this last expression by using the lens relation $$\frac{1}{s} + \frac{1}{s'} = \frac{1}{f} \tag{28}$$

where s and s' are the object and image distances from the lens, respectively, and f is the focal length of the lens. If the object size 0 is taken to be the same size as the lens, then $$\beta = \frac{0}{s'} = \frac{0}{f\left[\frac{s'}{s} + 1\right]} = \frac{0}{f\left[\frac{I}{0} + 1\right]} \tag{29}$$

Accordingly, $$\frac{\text{Blur}}{\text{Deflection}} \approx \frac{h}{f\cos\theta\left(\frac{I}{0} + 1\right)I} \tag{30}$$

On substituting for h from Equation 24, Equation 30 may be written as $$\frac{\text{Blur}}{\text{Deflection}} \approx \frac{\epsilon 0}{f\cos\theta <\frac{\partial w}{\partial x}>\left(\frac{I}{0} + 1\right)} \tag{31}$$

As a numerical example, the following values may be assumed

| | |
|---|---|
| fractional change in distortion $\epsilon$ = | 0.04 |
| intermediate image (mirror) size I = | 5 inches |
| fractional mirror distortion $<\partial w/\partial x>$ = | 0.05 |
| object (lens) size 0 = | 1 inch |
| angle of mirror $\theta$ = | 45° |
| focal length of lens f = | 12 inches |

For these physical values, Equation 24 give h=4″; the lens equation give s'=72 inches and s=14.4 inches; and Equation 11 give 0.015 for the ratio of blur deflection. Assuming the deflection is of the order of $\epsilon I$=0.2 inches at the intermediate image plane, this gives a blur size at the intermediate image plane of 0.003 inches which would be quite acceptable in a number of applications.

4. Projection on a Spherical Surface

Figure 3:
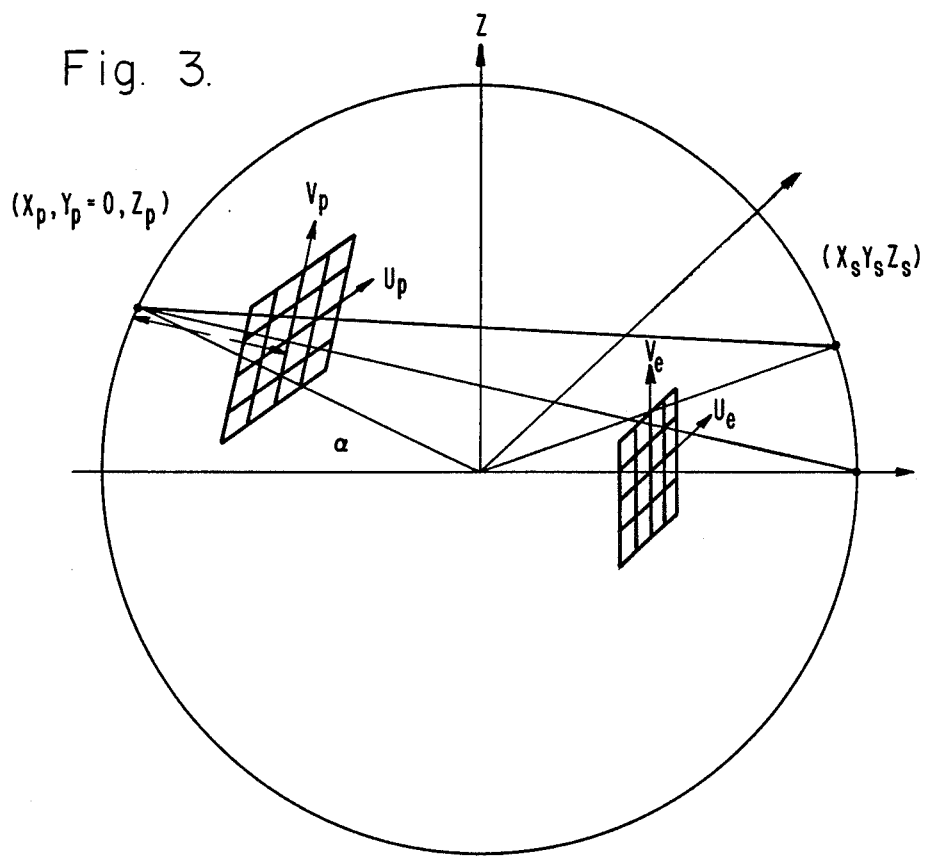
FIG. 3 illustrates the geometrical relationships describing the distorted image perceived by an observer at the center of a sphere, resulting when a flat-screen projector located on the sphere surface is used.
Figure 4:
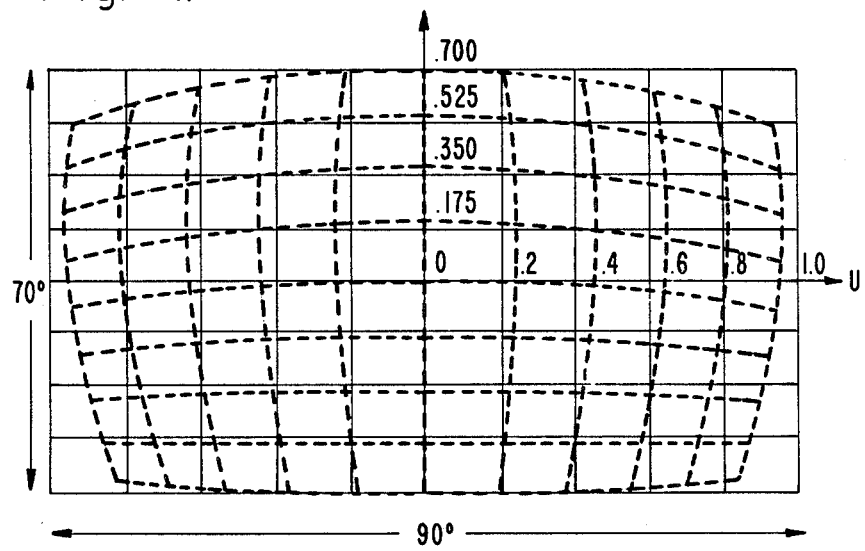
FIG. 4 is a graphical depiction of the relation of projector coordinates ($u_p, v_p$) shown in solid lines, and the correspondent observer coordinates ($u_e, v_e$), shown in dotted lines, for a projector at $\alpha = 25°$.

As an example of application of the invention, the foregoing results are applied to reduce the distortion which results when a projection lens appropriate for projection onto a flat screen is used instead to project onto the inside of the spherical dome. An observer is situated at the center of the sphere, and the projector is located behind the observer on the spherical shell at an elevation angle $\alpha$ above the observer's horizontal plane, as shown in FIG. 3.

Expressions have been derived which relate the coordinates of an image projected onto a spherical dome to the coordinates of the undistorted image which would be formed by projection onto a flat screen. FIG. 3 shows an observer located on the surface of the sphere of radius R and a projector located on the surface of the sphere at the position ($x_p$, $y_p=0$, $z_p$). The angle $\alpha$ is given by $\alpha = \sin^{-1}(z_p/R)$. The projector produces an image on the sphere surface, one point of which is denoted by the coordinates ($s_s$, $y_s$, $z_s$). On a plane perpendicular to the X-axis (located for convenience at a unit distance from the observer's eye), the point ($x_s$, $y_s$, $z_s$) appears to be located at the point ($u_e$, $v_e$), where the $U_e$ and $V_e$ axes are taken parallel to the Y and Z axes, respectively. On a plane at unit distance from the projector and oriented perpendicular to the projector axis, the point ($x_s$, $y_s$, $z_s$) appears to be located at the point ($u_p$, $v_p$). Here the $U_p$-axis is taken to be parallel to the Y-axis, and the $V_p$-axis lies in the X-Z plane. The problem, then, is to relate ($u_e$, $v_e$) to ($u_p$, $v_p$). This may be done by deriving expressions for the direction cosines of the respective vectors, rotating the coordinate system x-y-z about the y-axis by an angle of $\alpha/2$ so that the center line of sight of the projector aims at the center of field of view, to obtain the expressions for $u_p$ and $v_p$ of Equations 32a-b.

$$u_p = \frac{u_e}{(1+d)\cos\frac{\alpha}{2} - v_e \sin\frac{\alpha}{2}} \quad (32a)$$

$$v_p = \frac{(1-d)\sin\frac{\alpha}{2} + v_e \cos\frac{\alpha}{2}}{(1+d)\cos\frac{\alpha}{2} - v_e \sin\frac{\alpha}{2}} \quad (32b)$$

where $$d = \sqrt{1 + u_e^2 + v_e^2} \quad (32c)$$

The components of the distortion vector field $\Delta_x$ and $\Delta_y$ are given by Equations 33a-b.

$$\Delta_x = Cu_p - u_e \quad (33a)$$

$$\Delta_y = Cv_p - v_e \quad (33b)$$

where $u_p$ and $v_p$ are given in terms of $u_e$ and $v_e$ by Equation 32 and C is the factor by which the magnification of the projection lens should be reduced to give an image of the appropriate size when the projector is located on the surface of the spherical shell instead of at the center of the sphere with the observer. In the notation of Sections 1-4 above, $u_e$ is identified with x and $v_e$ with y. Accordingly, $$\Delta_x = x\left[\frac{C}{(1+d)\cos\frac{\alpha}{2} - y\sin\frac{\alpha}{2}} - 1\right] \quad (33a')$$

$$\Delta_y = \frac{C(1-d)\sin\frac{\alpha}{2} + Cy\cos\frac{\alpha}{2}}{(1+d)\cos\frac{\alpha}{2} - y\sin\frac{\alpha}{2}} - y \quad (33b')$$

where $$d = (1 + x^2 + y^2)^{\frac{1}{2}} \quad (33c')$$

For the expressions of Equations 33a'-c', $$\Delta \cdot \vec{\Delta} = G(x,y)[(1+d)\cos\alpha/2 - y\sin\alpha/2]^{-2} \quad (34a)$$

with $$G(x,y) = -4\cos^2\frac{\alpha}{2} + C\left(\cos\frac{\alpha}{2} + 1\right) + d\left\{-4\cos^2\frac{\alpha}{2} + C\left(1 + \cos\frac{\alpha}{2}\right) - 2C\sin^2\frac{\alpha}{2}\right\} - 2y^2 - 2x^2\cos^2\frac{\alpha}{2} + y\left\{4\sin\frac{\alpha}{2}\cos\frac{\alpha}{2} - C\sin\frac{\alpha}{2}\right\} - \frac{2yC}{d}\sin\frac{\alpha}{2}\cos\frac{\alpha}{2} + 4yd\sin\frac{\alpha}{2}\cos\frac{\alpha}{2} + C\left\{\frac{y^2}{d}\left(\sin^2\frac{\alpha}{2} - \cos^2\frac{\alpha}{2}\right) - \frac{x^2}{d}\cos\frac{\alpha}{2}\right\} \quad (34b)$$

Equation 34 and Equation 5 determine the W(x,y). The solution of Equation 5 can be expressed in the following way:

$$W(x,y) = \frac{1}{4\pi C'}\int\int dx'dy' \nabla \cdot \vec{\Delta}(x',y') \ln[(x-x')^2 + (y-y')^2] \quad (35)$$

Figure 5:
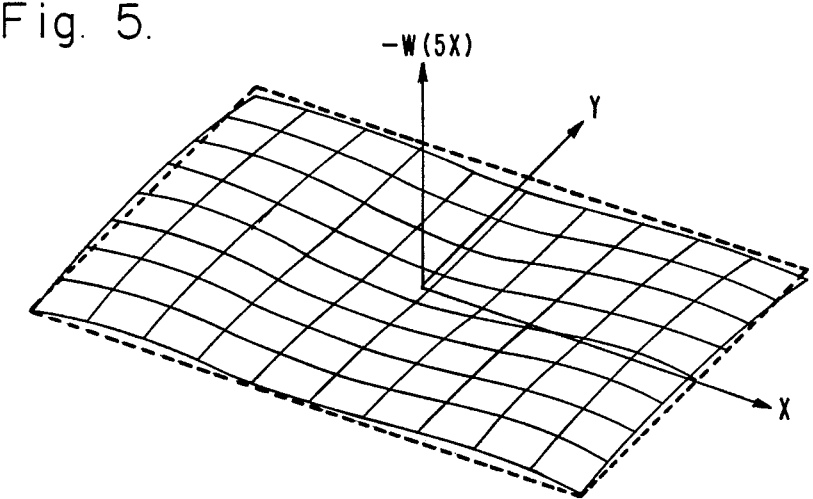
FIG. 5 depicts the deformation of a planar correcting mirror in accordance with the invention, to correct for distortion of an image projected onto a spherical dome surface.

FIG. 5 shows the W(x,y) which we computed from Equation 35, assuming $C'=1$, $C=2.2$ and $\alpha=25°$. (For clarity, W shown in FIG. 5 is 5 times its true value.)

With this W(x,y), the distortion (error) which remains after the projected image is reflected off the mirror is $$\delta_x = \Delta_x - \frac{\partial W}{\partial x} \quad (36a)$$

$$\delta_y = \Delta_y - \frac{\partial W}{\partial x} \quad (36b)$$

Figure 6:
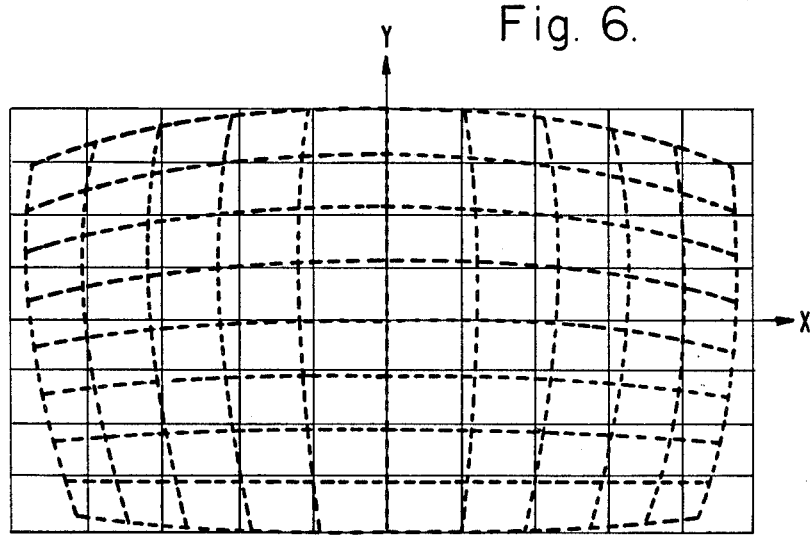
FIG. 6 depicts in graphical form the distortion field for a flat-screen projector at $\alpha = 25°$ on a domed surface without the correction mirror of the present invention.
Figure 7:
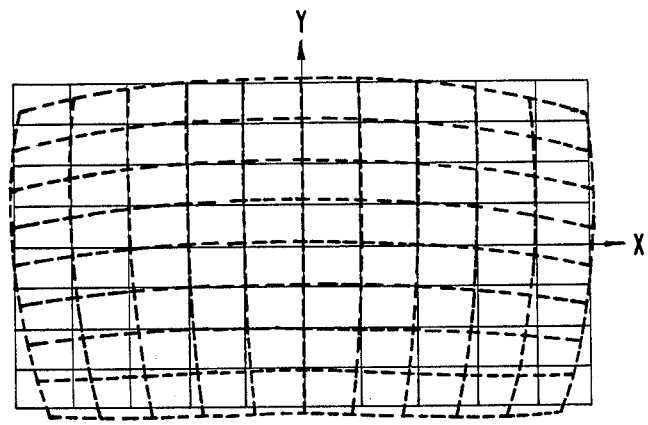
FIG. 7 depicts the residual distortion field for a flat-screen projector at $\alpha = 25°$ on a domed surface with the correction mirror of the present invention. (This is depicted as optimized for 90° H×70° V field of view.)

FIG. 6 displays the distortion field $\vec{\Delta}(x,y) \equiv (\Delta x, \Delta y)$ at $\alpha=25°$ on the dome surface without the correction mirror; the solid grid pattern represents $\Delta(x,y)=0$. FIG. 7 shows the residual distortion field $\vec{\delta}(x,y) \equiv (\delta_x, \delta_y)$ at $\alpha=25°$ on the dome surface with the correction mirror. The field-of-view for optimization was 90° H × 70° V for the result shown in FIG. 7. Better results can be obtained if only a smaller field-of-view is needed to be optimized.

Figure 8:
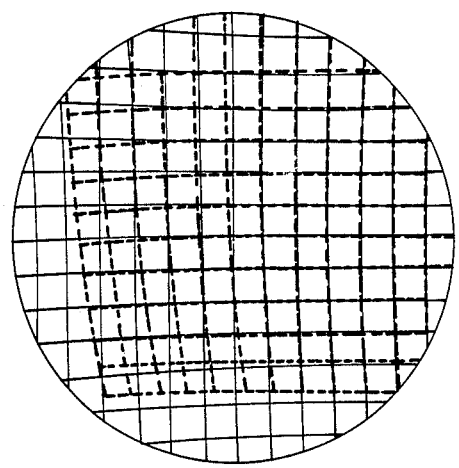
FIG. 8 depicts the experimental result with a uncorrected grid pattern which was projected through a planar mirror. Dotted lines depict the desired grid pattern.
Figure 9:
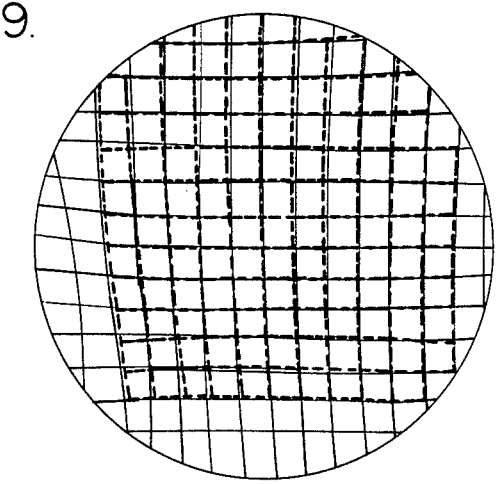
FIG. 9 depicts the experimental result with a corrected grid pattern which was projected through a properly contorted mirror. Dotted lines depict the desired grid pattern.

Experimental results indicate that significant reductions in distortion can be achieved with a non-planar mirror whose deviations from planarity are small. In the experiment, an adjustable contorted mirror was used to demonstrate the degree of reduction that can be achieved. The mirror used has an array of adjustable screws attached to the back side of a plane plastic mirror so that it could be deformed into arbitrary shapes. FIG. 8 and FIG. 9 show that very good distortion correction can be achieved. FIG. 8 shows a square grid pattern projected through a planar mirror, with the dotted lines indicating the desired grid pattern. FIG. 9 shows the same excepting that the mirror was properly contorted to create the desired grid pattern.

In general, the analysis suggests that when the distortion vector field $\vec{\Delta}(x,y)$ is almost all derivable from the gradient of a scalar, a contorted mirror located near any intermediate image plane in a projection system will be effective in reducing the distortion. The deviation from planarity of such a mirror $W(x,y)$ should be determined from Equation 5 in order to minimize the average magnitude of the residual (uncorrected) distortion over the field of view. If it is desirable to emphasize certain portions of the field of view more than others, $W(x,y)$ should be determined from Equation 10 instead. The pressures $p(x,y)$ which should be applied to a uniform planar plate mirror to give the deformations $W(x,y)$ of Equation 5 are given by Equation 21, and the corresponding moment sum $M(x,y)$ is given by Equation 22.

The slightly more complicated equations, Equations 14a–14d, should be used for $p(x,y)$ and the moments for nonuniform plates.

For moderate distortions, correction should occur without the image quality suffering appreciably. For extreme distortion, on the other hand, the removal of portions of the mirror away from the intermediate image plane could cause deterioration of image quality. Thus, if the lateral extent of the rays which eventually focus to a point at the image screen is $\xi$ at the mirror, and the distance from the mirror to the screen is L, then it is expected that a point to be blurred to an extent of $O(L\xi(\delta^2 w/\delta x^2))$ at the screen.

Fabrication of a deformed mirror following the specifications of Equations 5, 21 and 22 is relatively straightforward and inexpensive. Moreover, the chances of introducing other aberrations with the mirror are not as great as with a complex compound lens system and the design equations (Equations 5, 21 and 22) are easy to apply.

5. Thermal Stress

A particularly simple way of applying the required stress to the mirror is with heat. If the mirror is constructed of two bonded sheets of material 21 and 23 of different coefficients of thermal expansion, then heating to the mirror will cause it to deform. This heat can be easily applied by an array of electrical resistors attached to the back of the mirror. (Alternatively, the heat could be applied by a heat lamp, with masking to give a nonuniform distribution.) To estimate the deformation obtainable by this means, it may be assumed that the sheets have linear coefficients of thermal expansion $\alpha_a$ and $\alpha_b$. Then a change in temperature $T_1(x,y)$ from the ambient temperature would cause strains in an unconstrained material.

$$\epsilon_x = \alpha_i T_1 \quad \epsilon_y = \alpha_i T_1 \tag{37}$$

For a constrained plate, the corresponding stresses would be $$\sigma_x = \left(\frac{E\alpha}{1-\nu}\right)_i T_1, \quad \sigma_y = \left(\frac{E\alpha}{1-\nu}\right)_i T_1 \tag{38}$$

since $$\sigma_x = \frac{E}{1-\nu^2}(\epsilon_x + \nu\epsilon_y); \quad \sigma_y = \frac{E}{1-\nu^2}(\epsilon_y + \nu\epsilon_x) \tag{39}$$

For general $\epsilon_x$ and $\epsilon_y$, then, $$\sigma_x = \left(\frac{E\alpha}{1-\nu}\right)_i T_1 - \left(\frac{E}{1-\nu^2}\right)_i (\epsilon_x + \nu\epsilon_y) \tag{40a}$$

$$\sigma_y = \left(\frac{E\alpha}{1-\nu}\right)_i T_1 - \left(\frac{E}{1-\nu^2}\right)_i (\epsilon_y + \nu\epsilon_x) \tag{40b}$$

Assuming that each sheet has a thickness $h/2$, and taking the plane where the sheets are bonded together to be $Z=0$, the strains for an arbitrary curvature are $$\epsilon_x = \epsilon_x(x,y,z=0) - z\frac{\partial^2 W}{\partial x^2}(x,y) \tag{41a}$$

$$\epsilon_y = \epsilon_y(x,y,z=0) - z\frac{\partial^2 W}{\partial y^2}(x,y) \tag{41b}$$

Thus, the moments are given by $$M_x(x,y) = \int_{-h/2}^{h/2} \sigma_x z\, dz \tag{42a}$$

$$= \left[\left(\frac{E\alpha}{1-\nu}\right)_a - \left(\frac{E\alpha}{1-\nu}\right)_b\right]\frac{h^2}{4} T_1 -$$

$$\left[\left(\frac{E}{1-\nu^2}\right)_a - \left(\frac{E}{1-\nu^2}\right)_b\right]\frac{h^2}{4} \cdot$$

$$[\epsilon_x(x,y,z=0) + \nu\epsilon_y(x,y,z=0)] -$$

$$\left[\left(\frac{E}{1-\nu^2}\right)_a + \left(\frac{E}{1-\nu^2}\right)_b\right]\frac{h^3}{24}\left(\frac{\partial^2 W}{\partial x^2} + \nu\frac{\partial^2 W}{\partial y^2}\right);$$

$$M_y = \left[\left(\frac{E\alpha}{1-\nu}\right)_a - \left(\frac{E\alpha}{1-\nu}\right)_b\right]\frac{h^2}{4} T_1 - \tag{42b}$$

$$\left[\left(\frac{E}{1-\nu^2}\right)_a + \left(\frac{E}{1-\nu^2}\right)_b\right]\frac{h^2}{4}[\epsilon_y(x,y,z=0) +$$

$$\nu\epsilon_x(x,y,z=0)] - \left[\left(\frac{E}{1-\nu^2}\right)_a +$$

$$\left(\frac{E}{1-\nu^2}\right)_b\right]\frac{h^3}{24}\left(\frac{\partial^2 W}{\partial y^2} + \nu\frac{\partial^2 W}{\partial x^2}\right);$$

$$M_{xy} = \left[\left(\frac{e}{1+\nu}\right)_a + \left(\frac{E}{1+\nu}\right)_b\right]\frac{h^3}{24}\frac{\partial^2 W}{\partial x\partial y} \tag{42c}$$

The strains at the bonding plane, $\epsilon_x(x,y,z=0)$ and $\epsilon_y(x,y,z=0)$, can be determined from the force balance equations.

$$\frac{\partial}{\partial x}\left(\int_{-h/2}^{h/2} \sigma_x dz\right) = 0 \tag{43a}$$

$$\frac{\partial}{\partial y}\left(\int_{-h/2}^{h/2} \sigma_y dz\right) = 0 \tag{43b}$$

i.e., $$\left[\left(\frac{E\alpha}{1-\nu}\right)_a + \left(\frac{E\alpha}{1-\nu}\right)_b\right]\frac{hT_1}{2} - \left[\left(\frac{E}{1-\nu^2}\right)_a + \tag{44a}\right.$$

$$\left.\left(\frac{E}{1-\nu^2}\right)_b\right]\frac{h}{2}[\epsilon_x(x,y,z=0) + \nu\epsilon_y(x,y,z=0)] +$$

$$\left[\left(\frac{E}{1-\nu^2}\right)_a - \left(\frac{E}{1-\nu^2}\right)_b\right]\frac{h^2}{4}\left(\frac{\partial^2 W}{\partial x^2} + \nu\frac{\partial^2 W}{\partial y^2}\right) = 0$$

$$\left[\left(\frac{E\alpha}{1-\nu}\right)_a + \left(\frac{E\alpha}{1-\nu}\right)_b\right]\frac{hT_1}{2} - \left[\left(\frac{E}{1-\nu^2}\right)_a + \tag{44b}\right.$$

$$\left.\left(\frac{E}{1-\nu^2}\right)_b\right]\frac{h}{2}[E_y(x,y,z=0) + \nu\epsilon_x(x,y,z=0)] +$$

$$\left[\left(\frac{E}{1-\nu^2}\right)_a - \left(\frac{E}{1-\nu^2}\right)_b\right]\frac{h^2}{4}\left(\frac{\partial^2 w}{\partial y^2} + \nu\frac{\partial^2 w}{\partial x^2}\right) = 0$$

To determine the temperature distribution $T_1(x,y)$, the heat conservation equation may be written assuming that the resistive heating supplies $S(x,y)$ ergs/sec cm² to the mirror.

$$hK\nabla^2 T_1(x,y) = Ch\frac{\partial T_1}{\partial t} - S(x,y) + 4\sigma T_o^3 T_1 \tag{45}$$

Here K is the thermal conductivity, C is the specific heat, $\sigma$ is the Stefan Boltzmann constant, $T_0$ is the ambient temperature, and it has been assumed that $T_1 << T_0$. Typical values of the constants are $T_0 = 300°$ K.

$\alpha = 0(10^{-5} K^{-1})$ $E = 0(10^{12}$ dynes/cm²)

$K = 0(1$ cal-cm-sec) $= 0(4 \times 10^7$ erg-cm-sec)

$\sigma = 5.67 \times 10^{-5}$ erg/sec cm²$K^4$ $C = 0(10^7$ erg/cc)

For mirrors with characteristic dimensions of 0(10 cm) and thickness of 0(0.1 cm), and for time scales longer than seconds, Equation 45 can be written approximately $$hK\Delta^2 T_1(x,y) = -S(x,y) \tag{46}$$

The equations for the bonded sheets are Equations 42, 44, 46, 14d and 5. For the typical values of the constants cited earlier, these equations show that moderate rise in temperature (of the order of a few degrees) can lead to the desired mirro deformations of a few percent.

6. Dynamically Distortable Mirror System

Figure 10:
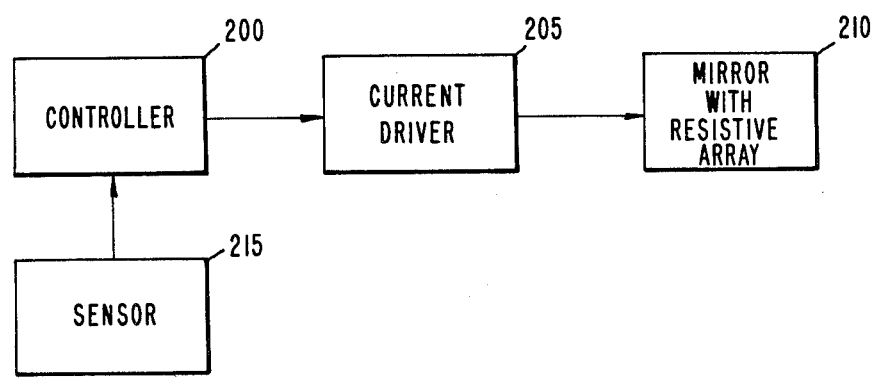
FIG. 10 is a simplified block diagram of a dynamically deformable mirror system for reduction of distortion in a projected image.

The distorted mirror as described above in Section 5 may be employed in a dynamically deformable mirror system, schematically illustrated in FIG. 10. The deformable mirror 210 comprises a bi-metallic mirror employing heating resistors $R_1$, with each resistor covering an area s. Each resistor has resistance value r, so that the heat energy generated for a particular resistor and current i is $i^2r$.

A current supply system 205 is adapted to provide individually determinable current magnitudes to the respective heating resistors $R_i$.

Controller 200 is coupled to current supply system 205. It provides control signals to the current supply 205 which are representative of the required deformations of mirror displacement, determined in accordance with the specifications discussed above.

For many applications, the required deformation of the mirror is dependent upon the direction angle in which the image is projected. For example, for the case of aircraft simulator wherein the observer is situated at the center of a hemispherical projection surface and the projector is located on the surface, the direction of the projector determines the distortion correction required for the projected image. This direction dependent data can be processed in real time in accordance with Section 4 above, or may be processed and then stored in the computer memory with the direction angle defining the appropriate memory addresses.

Since the characteristics of the image projection surface are known, the system requries no feedback correction to improve the image distortion. The provision of a sensor 215 adapted to provide direction signals to the controller indicative of the projection angle or direction provides a dynamic response capability of the system.

A particular example of an application for this system is aircraft simulators, where the pilot/observer is situated at the center of a dome, and a flat-screen projector is employed to project images simulating the external environment onto the dome surface. The direction of the observer's gaze may determine the particular sector of the dome being illuminated by the projector image. Thus, since the projector surface in relation to the projector will change as the projector direction shifts. The system of the present invention may be employed to compensate for the dynamically variable distortion.

It is understood that the above-described embodiments are merely illustrative of the many possible specific embodiments which can represent principles of the present invention. Numerous and varied other arrangements can be readily devised in accordance with these principles by those skilled in the art without departing from the spirit and scope of the invention.

What is claimed is:

1. An optical system for reduction of distortions in projected images, comprising:
   a deformable mirror having a reflective mirror surface disposed near an intermediate image plane of said optical system, said mirror comprising first and second bonded sheets of materials having different coefficients of thermal expansion; and
   displacement means for deforming said mirror surface so as to reduce predetermined distortions in the projected image.

2. The system of claim 1 wherein said displacement means comprises heating means for applying a nonuniform heat distribution to said mirror so as to obtain deformation of said mirror.

3. The system of claim 2 wherein said heating means comprises an array of electrical resistive elements thermally coupled to said mirror and electrical current supply means coupled to said resistive elements to provide a current distribution to said array to achieve said nonuniform heat distribution.

4. A system for dynamic reduction of distortions in projected images in an optical system comprising:

a deformable mirror disposed near an intermediate image plane of said optical system;

means for deforming said mirror so as to reduce predetermined distortions in said projected images;

controller means coupled to said means for deforming said mirror for causing dynamic deformation of said mirror in response to dynamic changes in said predetermined distortions.

5. The system of claim 4 wherein said predetermined distortions comprise distortions resulting from use of a projector apparatus designed for relatively distortion-free projection of an image onto a first surface contour to instead project such image onto a second surface contour.

6. The system of claim 5 wherein said controller comprises means for determining the characteristics of said distortions resulting from said projector apparatus.

7. The system of claim 6 wherein the characteristics of said second surface contour are dynamically variable, and said controller means causes said deforming means to dynamically deform said mirror in dependence upon said dynamically varying contour characteristics.

8. The system of claim 7 wherein said first contour comprises a flat surface contour, and said second surface contour comprises a curved contour.

9. The system of claim 8 wherein said curved contour comprises a partial spherical surface, whereby images are projected onto said spherical surface by a projector apparatus designed for image projection onto a flat surface, and said controller means comprises means for dynamically deforming said mirror in dependence upon the area of said spherical surface being illuminated by said projected image.

* * * * *